United States Patent [19]
Blengsli

[11] 3,847,632
[45] Nov. 12, 1974

[54] MASONRY MATERIAL

[75] Inventor: Helmer L. Blengsli, Mobile, Ala.

[73] Assignee: Tekology Corporation, Palisades Park, N.J.

[22] Filed: Oct. 30, 1972

[21] Appl. No.: 302,289

Related U.S. Application Data

[63] Continuation-in-part of Ser. No. 51,675, July 1, 1970, Pat. No. 3,701,671.

[52] U.S. Cl. .................................... 106/97, 106/89
[51] Int. Cl. ................................................. C04b 7/02
[58] Field of Search ............................... 106/97, 98

[56] References Cited
UNITED STATES PATENTS

| | | | |
|---|---|---|---|
| 3,366,720 | 1/1968 | Burger | 106/97 |
| 3,701,671 | 10/1972 | Blengsli | 106/89 |
| 928,061 | 7/1909 | Mitats | 106/98 |
| 2,302,988 | 11/1942 | Witty | 106/97 |

OTHER PUBLICATIONS

Lea & Desch, "The Chemistry of Cement and Concrete" Edw. Arnold & Sons, pp. 342–343, (1956).

*Primary Examiner*—Delbert E. Gantz
*Assistant Examiner*—James W. Hellwege
*Attorney, Agent, or Firm*—Edward J. Sites

[57] ABSTRACT

A new masonry material is provided in the form of shaped units, such as bricks, building blocks and tiles. The shaped masonry articles are made by blending a unique aggregate found in the Bahama Islands and the surrounding Caribbean Islands, with a hydraulic cement and sufficient water to hydrate the cement. The resulting mixture is formed into the desired shape under pressure in excess of about 500 psi and then allowed to cure. The shaped masonry materials of this invention, because of their unexpected strength, can be utilized in construction of buildings and the like.

4 Claims, No Drawings

MASONRY MATERIAL

CROSS REFERENCE TO RELATED APPLICATIONS

The application is a continuation-in-part of application Ser. No. 51,675, now U.S. Pat. No. 3,701,671, filed July 1, 1970, entitled "Masonry Material and Method of Making the Same."

BRIEF SUMMARY OF THE INVENTION

This invention relates to a new masonry material which is formed into shaped masonry articles, such as brick, building blocks and tiles. The masonry material is made from a unique aggregate found primarily in the Bahama Islands and the surrounding Caribbean Islands. The aggregate is crushed to a particle size of from 8 mesh to pan. The crushed aggregate is then blended with a hydraulic cement and sufficient water to hydrate the cement. The mixture is blended and then formed into the desired shape under pressure of in excess of 500 psi. The resulting uncured shaped object is then allowed to cure. The initial uncured strength of the product can be improved by including an inorganic chloride in the mixture. The water absorbency of the final product can be reduced by substituting either silicon sand or Bahamian dredged sea sand for a portion of the aggregate.

DESCRIPTION OF THE PRINCIPAL ART

Shaped masonry articles, such as bricks, building blocks and tiles are conventionally made in one of three ways. The article can initially be formed of a clay, dried until it is substantially free of water and then fired until it sinters into a unitary mass. A second method commonly employed is the sand-lime process in which a mixture of lime and sand is shaped and then autoclaved to produce the final product. The third process used is the concrete process, wherein selected aggregates are mixed with Portland cement and water and tamped or vibrated into a mold and then cured in a steam chamber or autoclave.

A problem encountered with all of the above described methods is that the required raw materials necessary are not readily available in the Bahama Islands, the Caribbean Islands and even certain parts of the United States, such as Southern Florida.

DESCRIPTION OF THE PREFERRED EMBODIMENTS

The principal raw material used to produce the shaped masonry articles of this invention are the Bahamian aggregate, silicon sand, Bahamian dredged sea sand, hydraulic cement, inorganic chlorides and water.

The Bahamian aggregate is mined in the Bahama Islands and surrounding Caribbean Islands by stripping off the overburden of topsoil so as to lay bare a porous calcareous mineral of predominantly calcite, associated with a slit deposit which in local terminology is called "clay." Mined, crushed, screened and finally washed with water to remove attached topsoil, several fractions are obtained, namely topsoil, "sludge," "sand," and "plant tailings."

The topsoil is not used to make the shaped masonry articles and accordingly is separated out and removed. The sludge, which is the result of the washing operation, contains a substantial amount of topsoil, upward of 30 percent of clay. The bulk of the solids in the sludge is calcite, which produced strong bricks, but the products made therefrom are not recommended for atmospheric exposure. Accordingly, this fraction is likewise removed.

The sand is predominantly comminuted calcite and may contain as much as 10 percent of clay. It is substantially free of topsoil. The plant tailings may contain as much as 15 percent of clay and traces of topsoil. Separate or in combination the sand and the plant tailings constitute the Bahamian aggregate, hereinafter simply referred to as the aggregate, of the present invention.

Chemically, the calcareous mineral is substantially pure calcium carbonate. Physically, it is of calcite crystalline structure and appears in a porous form akin to pumice but is more friable. Due to its porosity, it may absorb as much as 20 percent of water and still feel dry to the touch. It is believed that the porosity is, at least in part, responsible for its unique property as aggregate in the shaped masonry articles of this invention.

The clay, which is part of the aggregate to the extent of about 2 to 15 percent is not a clay in a mineralogical sense since it generally contains probably not more than 20 percent of aluminum silicate, and this chiefly in the form of a chlorite crystalline structure, the remainder being calcite and a minor content of marine-originated minerals having some cation exchange capacity. In view of this, the name clay is not strictly accurate, but since this designation has acquired commercial acceptance, it will be used in the disclosure and claims as referring to the silt deposit associated with the subsoil of the Caribbean Islands and in particular in the subsoil of the Bahama Islands.

Having now defined the chemical and physical properties of the aggregate of the invention it will be obvious that this material cannot be used as aggregate in brick and block manufacturing processes which require heat curing. The only conventional brick and block process in which the Bahamian aggregate might conceivably be used is the concrete process. However, even this is not possible. There are two main reasons for this. First, the Bahama mineral, when properly comminuted to serve as aggregate for masonry products, assumes a peculiarly high voluminosity that when mixed with cement and water the mix is incapable of being compacted by conventional vibration molding procedure used in the concrete brick and block industry. Secondly, due to the high porosity of the aggregate it will, when comminuted to proper particle size, absorb as much as 20 percent water and still feel dry to the touch. In conventional brick and block manufacturing processes in which practically no pressure is used in molding, the absorbed water is unavailable for hydration of the cement, and additional water is required for this purpose. The net result would be that the wet mix would be substantially over-gauged and the resulting product inherently weak.

The method for the manufacture of the shaped masonry articles and the products themselves have significant commercial value, especially in the Bahama Islands and the Caribbean Islands. The reason for this is that the Bahamian aggregate is the only material that is available in substantial quantities for conversion into masonry products in the area. The aggregates, however, by virtue of their calcareous nature cannot be used for masonry production in processes which require heat curing. In addition, because the process of the present invention does not require heat curing, the cost of heat curing is avoided, and more significantly the cost of heat curing equipment is also avoided, thus reducing the capital investment to approximately one-half of the investment cost in conventional processes.

Because of the lack of suitable raw materials in the Bahama Islands and the Caribbean Islands, shaped masonry articles, such as brick and building blocks, were either inherently weak if made from the locally available aggregates using conventional concrete brick and block techniques, or were quite expensive if imported from areas having suitable raw materials.

Now, using the process as disclosed herein, it is possible to manufacture high quality shaped materials from the available aggregates in the Bahama Islands and the Caribbean Islands at a cost such that they can be used both locally in load bearing structures or exported for use in other areas.

The primary advantage of the high pressure molding technique is the fact that it permits operation with a highly comminuted aggregate, which for the Bahamian aggregate is of utmost importance for production of a uniformly dense body and high mechanical strength of the products. Secondly, the high pressure molding technique reverses the capillary absorption of water in the porous aggregate and renders a sufficient quantity of this available for hydration of the cement, thus preventing the need of over-gauging the wet mix and thereby jeopardizing the compressive strength of the product. Thirdly, the combination of highly comminuted aggregate and high molding pressure results in products of clean and sharp edges and close dimensional tolerances.

Finally, a very important benefit of the high molding pressure is the fact that the high pressure forces the particles of the aggregate close together and thereby forces the cement paste to fill the reduced cavities between the particles. This is of utmost importance for a successful and economic utilization of such a highly porous aggregate in production of masonry materials of high compressive strength.

Further, if a high molding pressure were not used for the Bahamian aggregate, an unacceptably high percentage of cement paste would be required to fill the cavities, and even so adequate strength would not be attained since this is not only a function of the percentage of cement in the product, but also a function of the closeness, and thereby the rigidity of the aggregate particles in the cement matrix.

The process for manufacturing the shaped masonry articles comprises the following steps:

| Step 1. | Reducing the aggregate to a graduated particle size distribution; |
| Step 2. | Mixing the comminuted aggregate with a hydraulic cement and water; |
| Step 3. | Molding the mix under pressure; and |
| Step 4. | Curing the green product prior to shipment. |

Step 1 is of particular importance in order to make high quality masonry materials from the Bahamian aggregate. Since the Bahamian aggregate is porous and friable, it would, if used in coarse particle sizes, break down to some extent under the molding pressures employed and expose surfaces which have not been coated with the cement paste. This would produce dead spots in the body of the product and unsightly blemishes on the surfaces. To avoid this, the aggregate is milled or ground to a particle size which can withstand the molding pressures, and most preferably to a gradation of particle sizes which will insure uniform packing in the molding operation. Table I shows sieve analyses of comminuted aggregate particle size distribution from the barely acceptable in coarseness (Column A) to the barely acceptable in fineness (Column E). The generally preferred particle size distribution is illustrated by the sieve analyses as given in Columns C and D.

Table I

SIEVE ANALYSES OF COMMINUTED BAHAMIAN AGGREGATES

| U.S. Sieve No. | % on Sieves | | | | |
|---|---|---|---|---|---|
| | A | B | C | D | E |
| 4 – 8 | 22 | 10 | 5 | — | — |
| 16 | 20 | 15 | 15 | 2 | 2 |
| 30 | 20 | 20 | 20 | 18 | 8 |
| 50 | 20 | 20 | 25 | 30 | 20 |
| 100 | 10 | 20 | 15 | 20 | 25 |
| Pan | 2 | 10 | 20 | 30 | 45 |
| | 100 | 100 | 100 | 100 | 100 |

Step 2 is important since adequate mixing of the reacting components of the mix is a prerequisite for production of a homogeneous product of consistent mechanical strength. The mixing is preferably conducted in two steps: first dry mixing of aggregate and cement, followed by gradual addition of water and wet mixing. With modern efficient mixing the total mixing time may be as low as 2 – 3 minutes; however, 4 – 5 minutes total mixing time is preferred.

It is to be further noted that the choice of type and amount of cement used depends largely on the quality of the product desired. Any hydraulic cement may be used, including pozzolana, or pozzolana in connection with lime. Portland cement, alone or in admixture with lime, is especially advantageous, since the aggregate appears to have some pozzolana effect. Type III or rapid setting Portland cement, or the newer types of rapid setting cements are preferred, particularly for delicate shaped masonry products.

The amount of cement used ranges from 3 percent to 15 percent of the weight of the dry mix, i.e., aggregate and cement. The former is adequate for shaped masonry articles of "common" brick quality. The latter is used only for the highest grades of facing bricks. For ordinary grade facing brick of A.S.T.M compressive strength specification, 6 to 10 percent cement is generally adequate.

The amount of water used is important to produce high quality cementous products. There is a well-known rule in concrete formulations that an average w/c (water/cement) ratio of 0.6 should be maintained. It has been found that the w/c rule governing most concrete formulations does not apply to the concrete formulation containing the Bahamian aggregate. Due to the porous condition of this mineral substantially more water is required, since some of the gauging water will be trapped inside the aggregate particles. If this condition is not taken into account, a friable and useless product will be obtained.

Since for the Bahamian aggregate-cement mix there are two independent demands on the water, the amount of water required cannot be specified by a w/c ratio alone, but must be determined experimentally for the type and grind of aggregate used. The water demand ranges generally between 7 and 15 percent of the dry mix, i.e., aggregate plus cement.

For aggregate of low cation exchange properties, it has been found advantageous to use a small amount of a metallic chloride in the gauging water, for instance, in the amount of about 2 to 5 percent. Inorganic chlorides chosen from the group consisting of $CaCl_2$, $MgCl_2$, $AlCl_3$, and $HCl$, or a combination of these have proven beneficial in promoting early and increased strength of the products.

Step 3 is preferably accomplished by means of an automatic machine of high compression capacity. Such machines are commercially available which will fill the molds with a predetermined quantity of a mix, compress to a predetermined molding pressure, and eject the green product in a matter of seconds. Whereas the automatic feature is not a requirement, it is required that the molding equipment is capable of yielding a molding pressure of at least 500 psi on the product. For the highest grade of masonry products, it is desirable to mold under pressures of up to 6,000 psi.

A typical relationship between the molding pressure and the compressive strength of the product is illustrated by date in Table II. For most Bahamian aggregates 500 psi is a critical minimum; below this the compressive strength of the product falls off disproportionally with the molding pressure and has no commercial application.

Table II

COMPRESSION STRENGTH vs. MOLDING PRESSURE
FOR STANDARD BRICKS MADE FROM BAHAMA AGGREGATE
USING 10% PORTLAND CEMENT AND 15% WATER

| Molding Pressure psi | Compression Strength psi |
|---|---|
| 500 | 1,000 |
| 1,000 | 2,100 |
| 1,500 | 2,800 |
| 2,000 | 3,400 |
| 3,000 | 4,000 |
| 4,000 | 4,400 |
| 5,000 | 4,700 |
| 6,000 | 4,800 |

Step 4 relates to the handling of the green product after it is removed from the mold. The green product is generally sufficiently strong to be stacked or cubed as removed from the mold. It however requires some curing prior to shipment. The cure of the product can be accelerated by passage through a steam tunnel. The green product can also be cured at ambient temperature in the presence of sufficient moisture to prevent dehydration during a curing period of at least about 7 to 21 days. After curing it can be used for load bearing purposes. Unless the curing is accelerated by curing at a moderately higher than atmospheric temperature, as is normal for cementous products, the compressive strength will increase even after 21 days of normal temperature curing, but at a relatively low rate.

The Bahamian aggregate produces a strong and attractive building material in the form of bricks and blocks. The products however have a tendency to have a relatively high moisture absorption (15 to 18 percent) as measured by the 24 hour soak test. It has been found that this can be remedied if part of the Bahamian aggregate is substituted with a non-porous mineral, silica sand and the like. In the Caribbean Islands such minerals are not readily available, but it has been found that a marine-based mineral called "sea sand" in the local terminology is abundantly available and will reduce the moisture absorption. Chemically, the sea sand is a calcium carbonate. Geologically, it may be classified as an aragonite. It appears on the ocean bottom in a particle size distribution which is suitable for use as partial substitute for Bahamian aggregate up to about 50 percent. Such substitution reduced the moisture absorption of the finished products by 50 percent to well below the generally accepted limit of 10 percent.

Since any comminuted, substnatially non-porous mineral may be used for the purpose hereinabove described for sea sand, such agents may be classified as water absorption reducing agents, and as such function as a part of this invention.

The product of the present invention can best be described as being a shaped masonry object comprised of a composition of:
  a. about 85 – 97 parts by weight of an aggregate selected from the group consisting of:
   1. Bahamian aggregate as described above,
   2. a mixture of Bahamian aggregate and a relatively non-porous material such as silicon sand and/or Bahamian dredged sea sand with the Bahamian aggregate comprising at least about 50 percent total weight of the aggregate; and
  b. about 3 – 15 parts by weight of a hydraulic cement as described above.

The product further includes a sufficient amount of water to substantially completely hydrate the hydraulic cement. The product as noted above is obtained by blending the aggregate, hydraulic cement and water and forming the shaped masonry article under a pressure of from about at least 500 psi, and preferably up to about 6,000 psi.

Physically, the masonry materials are characterized by an extraordinary high compressive strength, equal to or substantially in excess of the A.S.T.M. specification for said masonry materials made according to conventional processes. The products of the invention are also characterized by an extraordinary high green strength of 290 to 580 psi which allows cubing immediately on removal from the molds.

The high green strength is a property traceable to the clay content of which 15 to 20 percent apparently classify as a chloride or true aluminum silicate. The remainder may best be defined as a conglomerate of various crystalline forms of calcium carbonate and a small percentage of marine salts of a minor cation exchange capacity.

As previously noted, products made from all Bahamian aggregates are likely to have high moisture absorption properties. In order to reduce the moisture absorption to acceptable dimensions, non-porous, granular minerals may be substituted in part for the porous Bahamian aggregate. In such a case the moisture absorption reducing agent will be a part of the product and will reduce the Bahamian aggregate by the amount of its presence.

Table III illustrates the quality of bricks and blocks produced by the process of the invention at a modest use of 5 to 10 percent of Portland cement.

TABLE III

COMPRESSIVE STRENGTH OF BRICKS AND BLOCKS MADE FROM BAHAMA AGGREGATE COMPARED WITH A.S.T.M. STANDARDS FOR CONCRETE BUILDING BRICKS AND BLOCKS

| psi | Compressive Strength |
|---|---|
| Bricks made from Bahama Aggregates | |
| 1. "Sand", 10 percent cement | 5,550 |
| 2. "Plant Tailings", 10 percent cement | 4,450 |
| 3. "Plant Tailings", 5 percent cement | 3,880 |
| 4. "Sand" + 50 percent "sea sand", 10 percent cement | 4,400 |
| A.S.T.M. Specification for Facing Bricks | |
| Grade U-I, U-II | 3,500 |
| Grade P-I, P-II | 2,500 |
| Blocks made from Bahama Aggregates | |
| 1. "Sand" + 50 percent "sea sand", 10 percent cement | 2,800 Net |
| 2. "Plant Tailings", 10 percent cement | 2,400 Net |
| A.S.T.M. - Hollow Load Bearing Blocks | |
| Grade U-I, U-II | 2,000 Net |
| Grade P-I, P-II | 1,000 Gross |

I claim:

1. A shaped masonry article in the form of a brick, building block or tile comprised of the reaction product obtained by molding, at a pressure of at least 500 psi, a mixture comprised of
   a. 85 – 97 parts by weight of an aggregate having a particle size not exceeding U.S. Standard Mesh 8, said aggregate containing at least 50 percent by weight of Bahamian aggregate, with the remainder of said aggregate being a granular, substantially non-porous, inorganic aggregate;
   b. 3 – 15 parts by weight of a hydraulic cement; and
   c. water in an amount sufficient to substantially completely hydrate the hydraulic cement and thereafter curing the resulting molded shaped article under ambient conditions in the presence of sufficient moisture so as to prevent dehydration until the hydraulic cement is substantially completely hydrated.

2. The shaped masonry article according to claim 1 wherein said hydraulic cement is selected from the group consisting of pozzolana cement, pozzolana cement with lime, Portland cement and Portland cement with lime.

3. The shaped masonry article according to claim 1 wherein said inorganic aggregate is selected from the group consisting of crushed rock, silica sand and Bahama dredged sea sand.

4. The shaped masonry article according to claim 1 wherein said water contains a chloride selected from the group consisting of HCl, $CaCl_2$ and $MgCl_2$.

* * * * *